(12) United States Patent
Keister et al.

(10) Patent No.: US 11,370,314 B1
(45) Date of Patent: Jun. 28, 2022

(54) INSULATION SYSTEM FOR REDUCING PARTIAL DISCHARGE IN MEDIUM VOLTAGE POWER CONVERTER

(71) Applicant: Resilient Power Systems, Inc., Athens, GA (US)

(72) Inventors: Josh Keister, Athens, GA (US); Mehdi Abolhassani, Houston, TX (US); Lyle T. Keister, Athens, GA (US)

(73) Assignee: Resilient Power Systems, Inc., Athens, GA (US)

( * ) Notice: Subject to any disclaimer, the term of this patent is extended or adjusted under 35 U.S.C. 154(b) by 0 days.

(21) Appl. No.: 17/565,868

(22) Filed: Dec. 30, 2021

(51) Int. Cl.
*B60L 53/302* (2019.01)
*B60L 53/16* (2019.01)

(52) U.S. Cl.
CPC ............ *B60L 53/302* (2019.02); *B60L 53/16* (2019.02); *B60L 2210/10* (2013.01)

(58) Field of Classification Search
CPC .................................................. B60L 53/302
USPC ........................................................ 320/109
See application file for complete search history.

(56) References Cited

U.S. PATENT DOCUMENTS

| | | | |
|---|---|---|---|
| 5,642,270 A | 6/1997 | Green et al. | |
| 7,256,516 B2 | 8/2007 | Buchanan et al. | |
| 9,780,682 B2 | 10/2017 | Keister et al. | |
| 9,906,155 B2 | 2/2018 | Keister et al. | |
| 10,131,239 B2 | 11/2018 | Herke et al. | |
| 10,608,545 B2 | 3/2020 | Keister et al. | |
| 10,696,183 B2 | 6/2020 | Roggendorf et al. | |
| 10,811,988 B2 | 10/2020 | Keister et al. | |
| 2011/0273917 A1 | 11/2011 | Maitra et al. | |
| 2012/0043922 A1* | 2/2012 | Jackson | H01H 33/68 318/813 |
| 2018/0339601 A1 | 11/2018 | Kruszelnicki | |
| 2020/0313443 A1 | 10/2020 | ElMenshawy et al. | |
| 2020/0338998 A1* | 10/2020 | Wainwright | B60L 53/302 |
| 2021/0292628 A1* | 9/2021 | Prentice | H01M 10/613 |

FOREIGN PATENT DOCUMENTS

WO      WO-2021123558 A1 *  6/2021

OTHER PUBLICATIONS

Chargepoint, Inc., CT 4000 Family, ChargePoint Level 2 Commercial Charging Stations, 2021, pp. 1-4.
TESLA; Supercharging Tesla, 2021, pp. 1-7.
(Continued)

*Primary Examiner* — Jerry D Robbins
(74) *Attorney, Agent, or Firm* — Trop, Pruner & Hu, P.C.

(57) ABSTRACT

In one embodiment, a system includes: an enclosure; a plurality of first converters adapted within the enclosure to receive grid power at a distribution grid voltage and convert the distribution grid voltage to at least one second voltage; at least one high frequency transformer adapted within the enclosure and coupled to the plurality of first converters to receive the at least one second voltage; a plurality of second converters adapted within the enclosure and coupled to an output of the at least one high frequency transformer to receive the at least one second voltage and convert the at least one second voltage to a third voltage; and a dielectric fluid adapted within the enclosure to provide dielectric isolation.

20 Claims, 10 Drawing Sheets

(56) References Cited

OTHER PUBLICATIONS

Andrew R. Hyde, Areva; Advanced Power Converters for Universal and Flexible Power Management in Future Electricity Networks, Project No. 019794, Project Acronym: UNIFLEX-PM; Nov. 30, 2009, pp. 1-21.

Josh Keister et al., U.S. Appl. No. 17/244,993, filed Apr. 30, 2021, entitled "System, Apparatus and Methods for Electric Vehicle Charging via a Power Conversion System".

Mehdi Abolhassani et al., U.S. Appl. No. 17/393,481, filed Aug. 4, 2021, entitled "Configurable Power Module for AC and DC Applications".

\* cited by examiner

INSULATION SYSTEM FOR REDUCING PARTIAL DISCHARGE IN MEDIUM VOLTAGE POWER CONVERTER

BACKGROUND

Power conversion systems are used to interface a variety of different electrical loads with a power system and any associated energy storage. Power conversion systems with transformers provide galvanic isolation and allow loads to be decoupled from distribution systems and to operate at different voltages and frequencies. However, space and energy is limited in many conversion systems.

Power conversion at higher frequencies improves power density and decreases size of electromagnetics and passive components. Yet in medium-voltage systems, electrical insulation becomes a great concern and demands extra spacing of components, as high frequency transformers typically include insulation that is deeply threatened by high voltage (HV) and high frequency (HF). Insulation and efficient cooling are two major contributor factors to high power density power conversion systems. The insulation material should exhibit both high dielectric strength and high thermal conductivity. High thermal conductivity and high dielectric strength are usually conflicting requirements for an insulating material, and thus typically require proper balancing to achieve the best performance.

Both air and solid insulation have reduced dielectric strength at higher frequencies compared to power frequency stress (at least by a factor of 2). Two significant effects contribute to insulation degradation and breakdown under the mixed-frequency voltage or pulse stresses. One degradation cause is partial discharge (PD) that results from enhanced peak voltage under high frequency, and another degradation cause is dielectric loss that could lead to thermal runaway. PD results from small electrical sparks that occur within insulation of components. Each discrete PD results from an electrical breakdown of an air pocket within the insulation. Generally, PD occurs due to inappropriate design or defect in manufacturing and contaminations either from internal or external sources, and is usually initiated at conductor dielectric interfaces within solid or dielectric insulating fluids, and/or bubbles and particle contaminants in insulation fluids. Once the discharge is initiated, it can accelerate the degradation of insulation materials, leading to aging and dielectric breakdown. Current partial discharge mitigation techniques unduly increase area, cost and complexity.

SUMMARY OF THE INVENTION

In one example, a system includes: an enclosure; a plurality of first converters adapted within the enclosure to receive grid power at a distribution grid voltage and convert the distribution grid voltage to at least one second voltage; at least one high frequency transformer adapted within the enclosure, the at least one high frequency transformer coupled to the plurality of first converters to receive the at least one second voltage; a plurality of second converters adapted within the enclosure and coupled to an output of the at least one high frequency transformer to receive the at least one second voltage and convert the at least one second voltage to a third voltage; and a dielectric fluid adapted within the enclosure, the dielectric fluid to provide dielectric isolation and wherein the plurality of first converters, the at least one high frequency transformer, and the plurality of second converters are immersed within the dielectric fluid.

In an example, the dielectric fluid is to provide partial discharge protection for the system. The plurality of first converters may be coupled to the at least one high frequency transformer via connection means of the at least one transformer, and at least some of the plurality of first converters are coupled via wires, cables, or flexible busbars to a corresponding one of a first plurality of reactors. The system may further include a plurality of high voltage wires or busbars, each of the plurality of high voltage wires or busbars coupled between one of the first plurality of reactors and one of a plurality of conductors. The system may further include a plurality of bushings adapted to the enclosure, each of the plurality of bushings to provide an insulative pathway for one of the plurality of conductors from an interior of the enclosure to an exterior of the enclosure.

In an example, the plurality of second converters may be coupled to the at least one high frequency transformer via second connection means of the at least one transformer, and at least some of the plurality of second converters are coupled via wires or busbars to a corresponding one of a second plurality of reactors. The dielectric fluid may comprise at least one of mineral oil, vegetable oil, or silicone fluid. The at least one high frequency transformer may electrically isolate the plurality of second converters. The at least one high frequency transformer may comprise a core, where the plurality of first converters are adapted radially from the core on a first side of the at least one high frequency transformer and the plurality of second converters are adapted radially from the core on a second side of the at least one high frequency transformer. The dielectric fluid may be a cooling medium for the system.

In another example, a system includes: an enclosure; a plurality of input power stages adapted within the enclosure, each of the plurality of input power stages to receive a phase of grid power at a distribution grid voltage and convert the distribution grid voltage to a first high frequency AC voltage; a high frequency transformer having a core and adapted within the enclosure. The high frequency transformer may have: a first plurality of connection means each for coupling the first high frequency AC voltage to one of a first plurality of winding sets adapted about the core; and a second plurality of connection means each for coupling a second high frequency AC voltage from one of a second plurality of winding sets adapted about the core to one of a plurality of output stages. The plurality of output stages may be adapted within the enclosure, each of the plurality of output stages to receive and convert the second high frequency AC voltage to a third voltage. The system may further include a dielectric fluid adapted within the enclosure, the dielectric fluid to provide dielectric isolation and wherein the plurality of input power stages, the high frequency transformer, and the plurality of output stages are immersed within the dielectric fluid.

In an example, the first plurality of connection means comprises a first plurality of terminal blocks and the second plurality of connection means comprises a second plurality of terminal blocks. In another example, the first plurality of connection means comprises a first plurality of cable connectors and the second plurality of connection means comprises a second plurality of cable connectors. In yet another example, the first plurality of connection means comprises a plurality of cable connectors and the second plurality of connection means comprises a plurality of terminal blocks.

In an example, the dielectric fluid comprises a cooling medium for the system. The system may further include a heat exchanger coupled to the enclosure, the enclosure comprising: a plurality of outlet ports via which the dielectric fluid is provided to the heat exchanger; and a plurality of inlet ports via which the dielectric fluid is received from the heat exchanger.

In yet another example, an electric vehicle (EV) charging system comprises: a housing; an enclosure adapted within the housing; a plurality of first converters adapted within the housing to receive grid power at a distribution grid voltage and convert the distribution grid voltage to at least one second voltage; at least one high frequency transformer coupled to the plurality of first converters to receive the at least one second voltage and a plurality of second converters coupled to an output of the at least one high frequency transformer; the plurality of second converters adapted within the housing and coupled to the output of the at least one high frequency transformer, each of the plurality of second converters to receive the at least one second voltage and convert the at least one second voltage to a third DC voltage; a dielectric fluid adapted within the enclosure, the dielectric fluid to provide dielectric isolation and wherein the plurality of first converters, the at least one high frequency transformer, and the plurality of second converters are immersed within the dielectric fluid; and one or more EV charging dispensers coupled to the housing to receive the third DC voltage from at least one of the plurality of second converters and provide a charging voltage or a charging current to one or more EVs.

In an example, the EV charging system further comprises an active cooling system. The enclosure may include: a plurality of outlet ports via which the dielectric fluid is provided to the active cooling system; and a plurality of inlet ports via which the dielectric fluid is received from the active cooling system. The dielectric fluid may provide partial discharge protection for the EV charging system; the at least one high frequency transformer may electrically isolate the plurality of second converters; and each of the plurality of second converters may convert the at least one second voltage to the third DC voltage galvanically isolated from the third DC voltage of others of the plurality of second converters.

DETAILED DESCRIPTION

In various embodiments, a power conversion system may be provided in an enclosure that houses the various components of the system and further includes a dielectric fluid. By way of providing a fully enclosed enclosure filled with dielectric fluid, e.g., via a vacuum impregnation process, there is no air or other impurities within the enclosure. This vacuum impregnation process can be used to remove air voids within transformer windings and other components. As such, partial discharge during operation of the system may be avoided or at least substantially reduced.

Furthermore, by way of this arrangement, a much smaller configuration for a system such as a medium voltage (MV) power conversion system may be realized, in that conventional isolation techniques such as separating components by wide distances, providing insulation materials and so forth, can be avoided. In addition, wires and other conductors within the system may be implemented using lower voltage rating materials, although substantial voltages and/or currents may be present. Still further the dielectric fluid, in addition to providing isolation between components and significantly reducing or eliminating partial discharge, also may serve as an effective cooling medium, either passively or as part of an active cooling system.

In various embodiments, dielectric-based partial discharge protection may be used in an electric vehicle (EV) charging system having direct connection to a grid network and generates from received grid power one or more sources of charging power that can be provided to one or more EV charging stations. In this way, EVs connected to an EV charging station can be efficiently charged at a charging voltage and/or charging current that may be dynamically controlled, while providing partial discharge protection and efficient cooling using a dielectric fluid in which components of the system may be immersed.

Figure 1A:
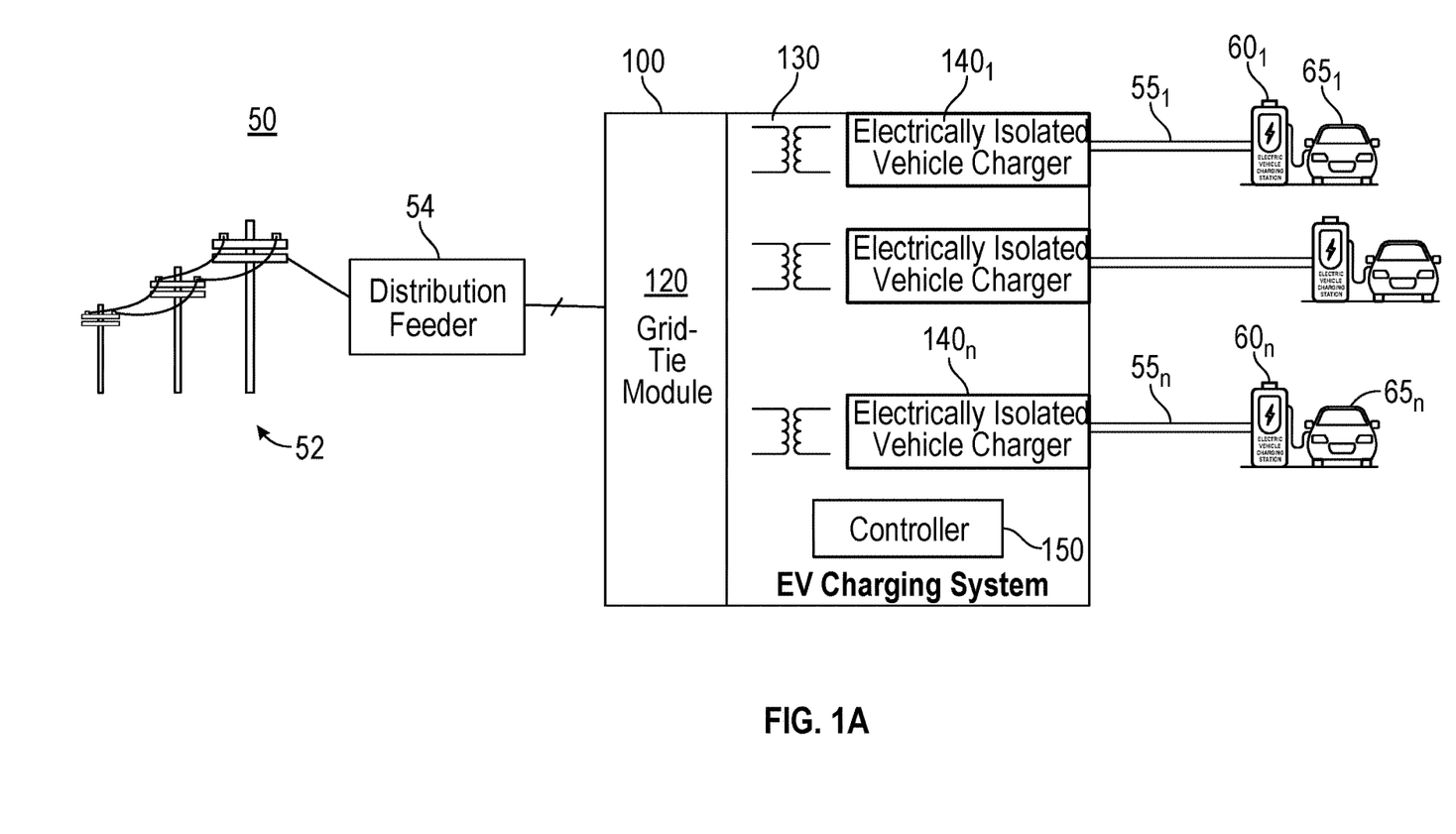
FIG. 1A is a block diagram illustrating an environment in which an EV charging system accordance with an embodiment may be used.

Referring now to FIG. 1A, shown is a block diagram illustrating an environment in which an EV charging system in accordance with an embodiment may be used. More particularly in FIG. 1A, an EV charging system 100, which may be a distributed modular-based charging system, couples between a grid network 50 (represented by transmission lines 52 and a distribution feeder 54) and multiple EV charging stations $60_1$-$60_n$ (also referred to herein as "dispensers"), each of which may be implemented with one or more EV distributors to enable charging of an EV (representative EVs $65_1$-$65_n$ are shown in FIG. 1A). Note that system 100 may be implemented, at least in part, within an enclosure that is sealed in the field so that components therein can be immersed within a dielectric fluid as described herein.

Embodiments may be used for use with distribution grid networks that provide power at medium voltage levels (e.g., between approximately 1000 volts (V) and 35000V) and at a low frequency (e.g., 50 or 60 Hertz (Hz)). For ease of discussion, understand that the terms "grid," "grid network" or "distribution grid network" are to be used interchangeably to refer to a power distribution system that provides medium voltage power at low frequency. With embodiments herein, an EV charging system such as charging system 100 may directly couple to a medium voltage distribution grid network (which may be an AC voltage grid or a DC voltage grid) without an intervening power transformer. Stated another way, embodiments provide an EV charging system that can be adapted to couple to a distribution grid network without a step up transformer, also known as a power or distribution transformer.

In this way, EV charging system 100 may directly receive incoming grid power with a grid voltage at a medium voltage level and a low frequency. As used herein, the terms "direct connection" and "direct coupling" with respect to an EV charging system mean that this system receives distribution grid power at a distribution grid network-provided grid voltage at a distribution grid network low frequency without presence of intervening components. Note that an EV charging system may couple to a grid network through a line reactor, a fuse, a circuit breaker, and/or a power circuit disconnect, and still be considered to be in a "direct coupling" with the grid network.

With embodiments, a means is provided for charging electric vehicles or other moving objects. In implementations, high power fast charging may be provided for electric vehicles by connecting to a medium voltage AC or DC distribution feeder. With an EV charging system as described herein, use of components including large magnetics components such as distribution transformer and in-line reactors may be avoided.

Charging system 100 may be implemented as a modular facility. Still further with embodiments herein in which the need for a power transformer is avoided, EV charging system 100 may be implemented with a relatively small and low cost arrangement. For example, in embodiments herein an EV charging system having a total apparent power of 5 megavolt amperes (MVA) may be configured in one or more modular cabinets having approximate dimensions of 2 meters (m)×1.6 m×2.4 m. Thus without the need for a power transformer, an EV charging system may be readily adapted in many different locations such as densely populated urban areas, shopping centers, big box stores, and so forth. In addition, a charging system for EV charging stations may be designed to be power dense and efficient. For purposes of operation, maintenance and packaging, modular and scalable power conversion blocks may be used, and can be the foundation for enabling advanced loads. As such, embodiments provide a modular, power-dense, and efficient power conversion system for EV charging stations.

In industrial power conversion applications, low voltage is typically most cost-efficient at low power levels, while medium voltage is typically superior at high power levels. With embodiments herein, a power density of an EV charging system can be up to 10× greater than an EV charging station having a power transformer (at its input) and a low voltage power conversion scheme. As one example, a power conversion scheme at 12470V versus 480V will require 26 times (12470V/480V=26) less current. Since conductor capacity is determined by $I^2R$ (where I is current and R is resistance), an equivalent 480V charging system would be required to implement conductors that are 675 times larger than conductors for a medium voltage EV charging system in accordance with an embodiment. Continuing with this example, a 1 MW 480V charging system may have a rated current of approximately 1200 amperes root mean squared (Arms), whereas a 1 MW 12470V charging system in accordance with an embodiment may have a rated current of approximately 46.3 Arms. Furthermore, low voltage transformer cost/size typically increases significantly above 1 MVA, such that a typical maximum transformer size for a low voltage charging station is 1 MVA. Thus embodiments may enable lower cost, lower size, lower complexity charging stations that realize greater charging capacity.

Still with reference to FIG. 1A, distribution feeder 54 of grid network 50 may be a medium voltage AC or DC distribution feeder. As illustrated, distribution feeder 54 is directly coupled to EV charging system 100 via three-phase connections.

Charging system 100 includes a grid-tie module 120. In embodiments herein, grid-tie module 120 may be configured to receive grid power at an incoming grid voltage (which as described above may be an AC or DC voltage) and perform an initial conversion of the incoming grid voltage to a voltage that is at different magnitude and/or frequency. Depending on implementation, grid-tie module 120 may convert the incoming grid voltage to one or more DC or AC voltages at different magnitude or frequency. To this end, grid-tie module 120 interfaces with medium voltage AC or DC grid network 50 and utilizes power electronics converters to convert the AC or DC grid voltage to a voltage that is at different magnitude and/or frequency. Grid-tie module 120 may include multiple stages that may be isolated from each other. In other implementations, at least some of these stages may be cascaded together to increase voltage capabilities.

In particular embodiments herein, grid-tie module 120 may include power electronics-based converters to convert the incoming AC or DC grid voltage. As an example, grid-tie module 120 may include so-called H-bridge power converters to receive the incoming grid voltage and perform a voltage/frequency conversion, e.g., to a DC voltage. In turn, grid-tie module 120 may further include a first stage of a DC-DC converter to convert the DC voltage to a high frequency AC voltage (e.g., a square wave voltage) at a given high frequency (e.g., between 5 kilohertz (kHz) and 100 kHz).

As further illustrated in FIG. 1A, this high frequency AC voltage may be provided to a transformer network 130. In the embodiment shown in FIG. 1A, transformer network 130 includes multiple isolated transformers, each having a single primary winding and a single secondary winding. In other implementations a transformer network may take the form of a single transformer having a single primary winding and multiple secondary windings.

In either case, transformer network 130 is configured as a high frequency transformer. In embodiments, transformer network 130 may operate at frequencies between approximately 5 kHz and 100 kHz. By virtue of this high frequency of operation, the need for large magnetics at a front end can be avoided. In one implementation transformer network 130 may have a size of less than approximately 1 m×1 m×0.25 m. Transformer network 130 outputs galvanically isolated AC voltages. In this way, transformer network 130 provides electrical isolation between distribution feeder 54 and EV charging stations 60.

Still referring to FIG. 1A, the secondary windings of transformer network 130 each may be coupled to an electrically isolated vehicle charger $140_1$-$140_n$. In embodiments herein, each vehicle charger 140 may be configured as a power electronics converter that converts the secondary voltage output by transformer network 130 to a voltage (e.g., DC) at a different frequency and/or magnitude. More particularly for vehicle charging as described herein, vehicle chargers 140 may include DC-DC converters to provide charge capabilities to at least one EV charging station 60.

Continuing with the above discussion in which an AC voltage is output from transformer network 130, vehicle chargers 140 may include an AC-DC converter as well as a DC-DC converter to provide charging capability at a desired charging voltage and/or charging current.

Figure 1B:
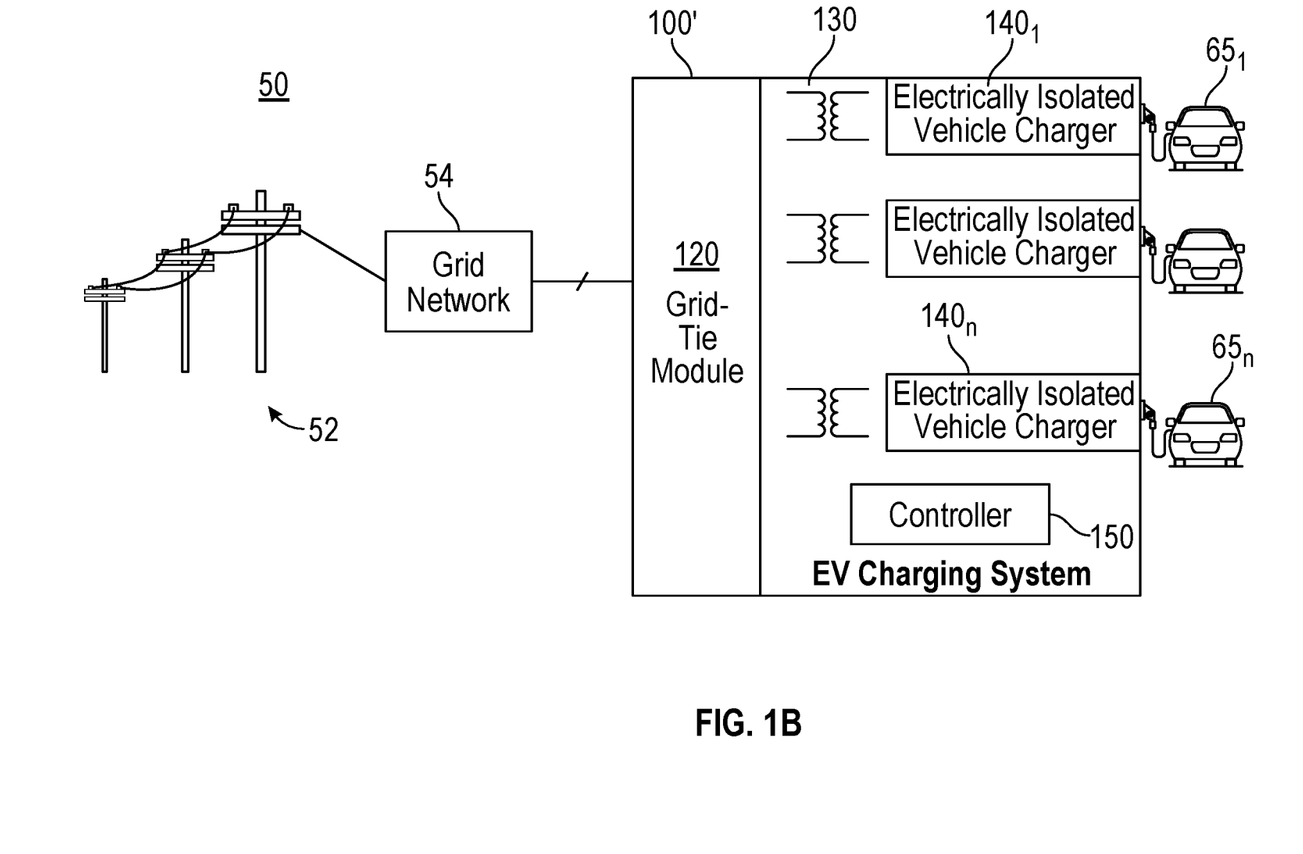
FIG. 1B is a block diagram illustrating another environment in which an EV charging system accordance with an embodiment may be used.

As shown in FIG. 1A, EV charging system 100 may be coupled to charging stations 60 via a plurality of output lines 551-$n$. Although different connection topologies are possible (including direct connection as shown in FIG. 1B, discussed below), FIG. 1A shows an implementation in which each output line 55 is dedicated to a single charging station 60.

To effect control of EV charging system 100, at least one controller 150 may be present. In various embodiments, controller 150 may include one or more central processing units (CPUs) or systems on chip (SoCs), a dedicated microcontroller or other programmable hardware control circuit such as programmable logic. In one embodiment, controller 150 may form a distributed control architecture. In any case, controller 150 may be configured to execute instructions stored in one or more non-transitory storage media. Such instructions may cause controller 150 to automatically and dynamically control charging voltages and/or charging currents depending upon capabilities and requirements of charging stations 60 and/or connected EVs 65.

Controller 150 may be configured to control, in addition to one or more configurable charging modes, one or more generation and/or storage modes, in which energy stored in one or more batteries of an EV may be stored within a storage within or coupled to EV charging system 100 (such as one or more batteries (not shown for ease of illustration in FIG. 1A)) or provided as energy to the grid, e.g., via connection to distribution feeder 54, as will be described further herein.

Although shown with this particular implementation in the embodiment of FIG. 1A, many variations and alternatives are possible. For example, an EV charging system may be configured to directly connect to EVs. Referring now to FIG. 1B, shown is a block diagram illustrating another environment in which an EV charging system in accordance with an embodiment may be used. More particularly in FIG. 1B, an EV charging system 100' may be configured the same as system 100 of FIG. 1A, with the sole difference being that system 100' provides vehicle charging connectors integrated therein such that output lines 55 and charging stations 60 may be eliminated. Thus as shown in FIG. 1B, system 100', via chargers 140 and integrated charging connectors, directly connect to EVs 65.

In still further implementations an EV charging system also may include capabilities to provide load power to a variety of AC loads, such as industrial facilities or so forth. In addition, the EV charging system may be configured to receive incoming energy, such as from one or more photovoltaic arrays or other solar panels and provide such energy, either for storage within the EV charging system, distribution to the grid and/or as charging power to connected EVs.

Figure 2:
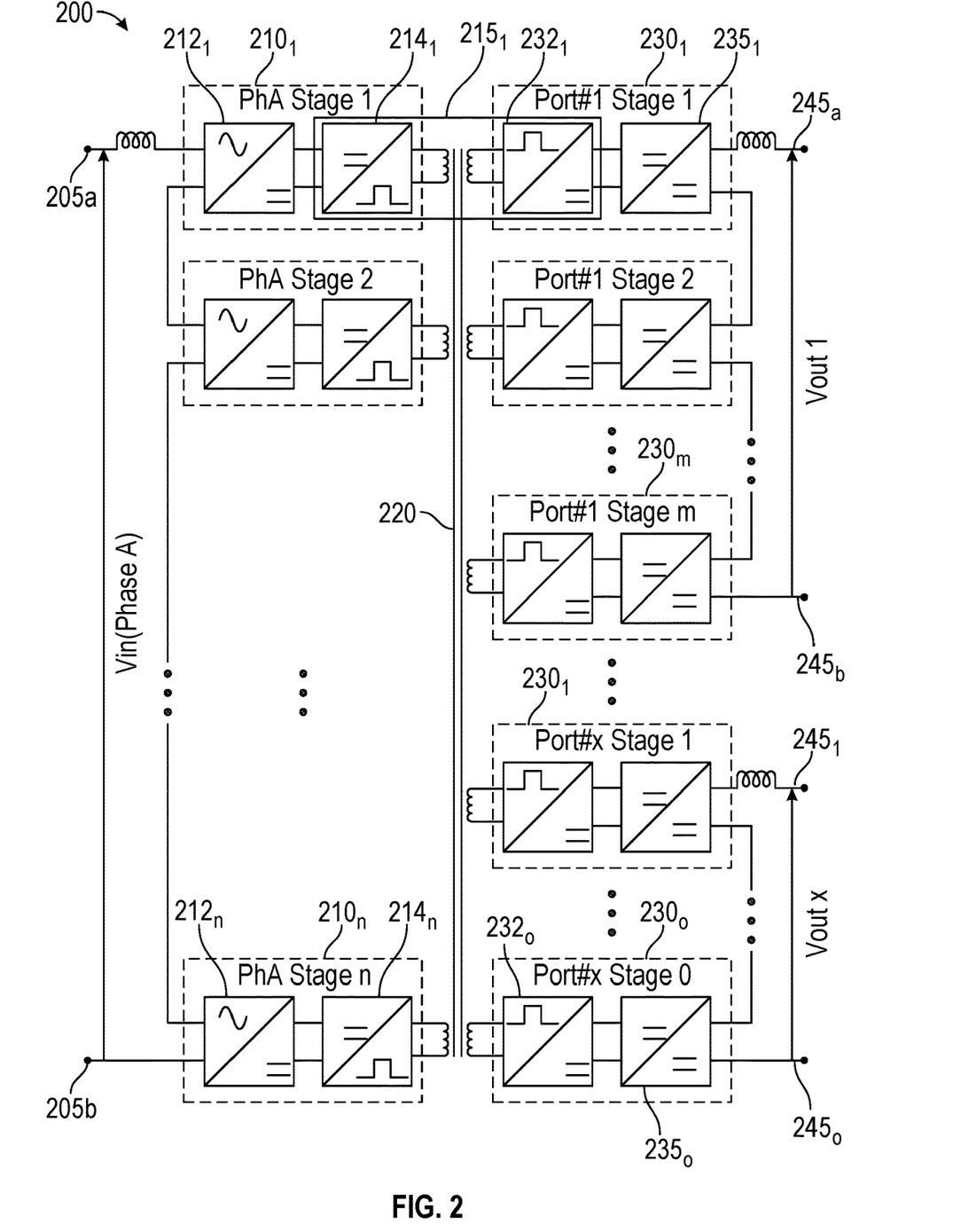
FIG. 2 is a block diagram of an EV charging system in accordance with a particular embodiment.

As described above, different configurations of EV charging systems are possible. Referring now to FIG. 2, shown is a block diagram of an EV charging system in accordance with a particular embodiment. As shown in FIG. 2, EV charging system 200 is a multi-port modular power converter that uses a single transformer. In FIG. 2, understand that a single phase is illustrated for ease of discussion. In a given charging system there may be three phases, each configured as shown in FIG. 2 or combined as a single transformer.

Incoming grid power is received at a given grid voltage via input nodes 205$a$, 205$b$. Although embodiments are not limited in this regard, in FIG. 2 this grid voltage may be received as a medium AC voltage, e.g., at a voltage of between approximately 1 and 50 kilovolts (kV) and at a grid frequency of 50 Hz or 60 Hz. As shown, an input inductance couples to input node 205$a$.

The incoming voltage is provided to a plurality of input stages, each of which may include multiple H-bridge converters. More specifically, a plurality of input stages $210_1$-$210_n$ are shown that are cascaded together. Each input stage may include a grid-side converter $212_{1-n}$ (shown as an AC-DC converter). In turn each grid-side converter 212 couples to a DC-AC converter $214_1$-$214_n$ of a given DC-DC converter $215_1$-$215_n$. Thus each grid-side converter 212 receives an incoming grid AC voltage and converts it to a DC voltage, e.g., at the same or different voltage magnitude. While embodiments may typically implement converters 212 and 214 (and additional converters described below) that are symmetric, it is also possible for there to be asymmetric configurations across power stages.

In an embodiment, each grid-side converter 212 may be implemented as an H-bridge converter including low voltage or medium voltage switches, e.g., silicon carbide (SiC) devices. In other embodiments, each grid-side converter 212 may be formed as a multi-level rectifier. The resulting DC voltages are in turn provided to corresponding DC-AC converters 214 that act as an input stage of an isolated DC-DC converter 215. In embodiments, converters 214 may be implemented as H-bridge converters to receive the DC voltage and convert it to a high frequency AC voltage, e.g., operating at a frequency of up to 100 kHz. While a square wave implementation is shown in FIG. 2, understand that in other cases the AC voltage may be sinusoidal.

The high frequency voltage output from converters 214 may be provided to a corresponding primary winding of a transformer 220, namely a high frequency transformer. While shown in FIG. 2 as a single transformer with multiple primary windings and multiple secondary windings, in other implementations separate transformers may be provided, each with one or more primary windings and one or more secondary windings.

In any event, the galvanically isolated outputs at the secondary windings of transformer 220 may be provided to a plurality of output stages $230_1$-$230_o$. As such each output stage 230 includes an AC-DC converter $232_1$-$232_o$ (of a DC-DC converter 215). Thereafter, the output DC voltage may be further adjusted in magnitude in corresponding load-side converters $235_1$-$235_o$ (and $235_1$-$235_o$).

As illustrated, output stages 230 thus include a given output stage (namely stage 232) of a DC-DC converter 215 and a load-side converter 235. As shown in FIG. 2, multiple output stages 230 may couple together in cascaded fashion (e.g., either in a series connection as shown in FIG. 2 or in a parallel connection) to provide a higher output voltage and/or current depending upon load requirements. More specifically, a first set of output stages $230_1$-$230_m$ are cascaded together and couple to output nodes $245_{a,b}$. In turn, a second set of output stages $230_1$-$230_o$ are cascaded together and couple to output nodes $245_{1,o}$. The resulting outputs are thus at a given DC voltage level and may be used as a charging voltage and/or current for connected EVs. While this particular arrangement with cascaded input and output stages are shown in FIG. 2, understand that a multi-port power converter may be implemented in other manners such as using modular high frequency transformers. Still further, understand that the actual included DC-DC converters may have a variety of different topologies.

Figure 3:
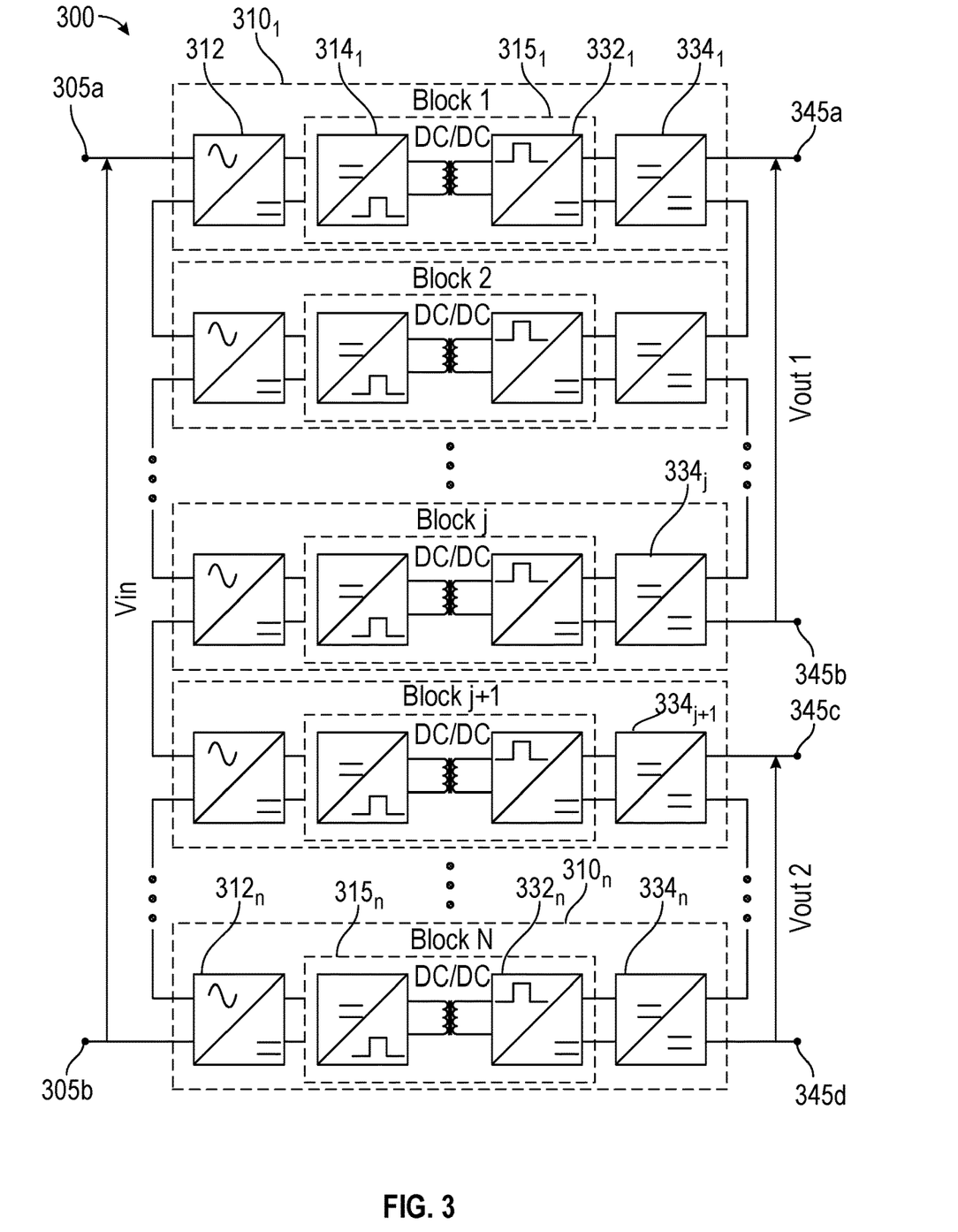
FIG. 3 is a block diagram of an EV charging system in accordance with another embodiment.

For example, in other cases a modular high frequency transformer may be used. Referring now to FIG. 3, shown is a block diagram of an EV charging system in accordance with another embodiment. As shown in FIG. 3, EV charging system 300 is a multi-port modular power converter that uses a modular transformer. As in FIG. 2, a single phase is illustrated for ease of discussion.

Incoming grid power is received at a given grid voltage via input nodes 305a, 305b. The incoming voltage is provided to a plurality of input stages, each of which may include multiple H-bridge converters. More specifically, a plurality of power converter stages $310_1$-$310_n$ are shown. Each stage 310 may include a grid-side converter $312_1$-$n$ (shown as an AC-DC converter) and a DC-AC converter $314_1$-$314_n$ of a given DC-DC converter $315_1$-$315_n$. Via independent transformers of DC-DC converters 315, a resulting electrically isolated DC voltage is provided to an AC-DC converter $332_1$-$332_n$ and thereafter to a load-side converter $334_1$-$334_n$. Note that operation may be similar to that discussed in FIG. 3. In one embodiment, each load-side converter $334_1$-$334_n$ may provide a voltage to the load, e.g., connected electric vehicles. However here note that potentially different amounts of load-side converters 334 may be cascaded to provide a given DC voltage to a load (e.g., EV charging station). As one example, a first set of load-side converters $334_1$-$334_j$ may provide a first charging voltage of approximately 1500 volts via output nodes 345a,b. And a second set of load-side converters $334_{j+1}$-$334_n$ may provide a second charging voltage of approximately 1000 volts via output nodes 345c,d.

Figure 4A:
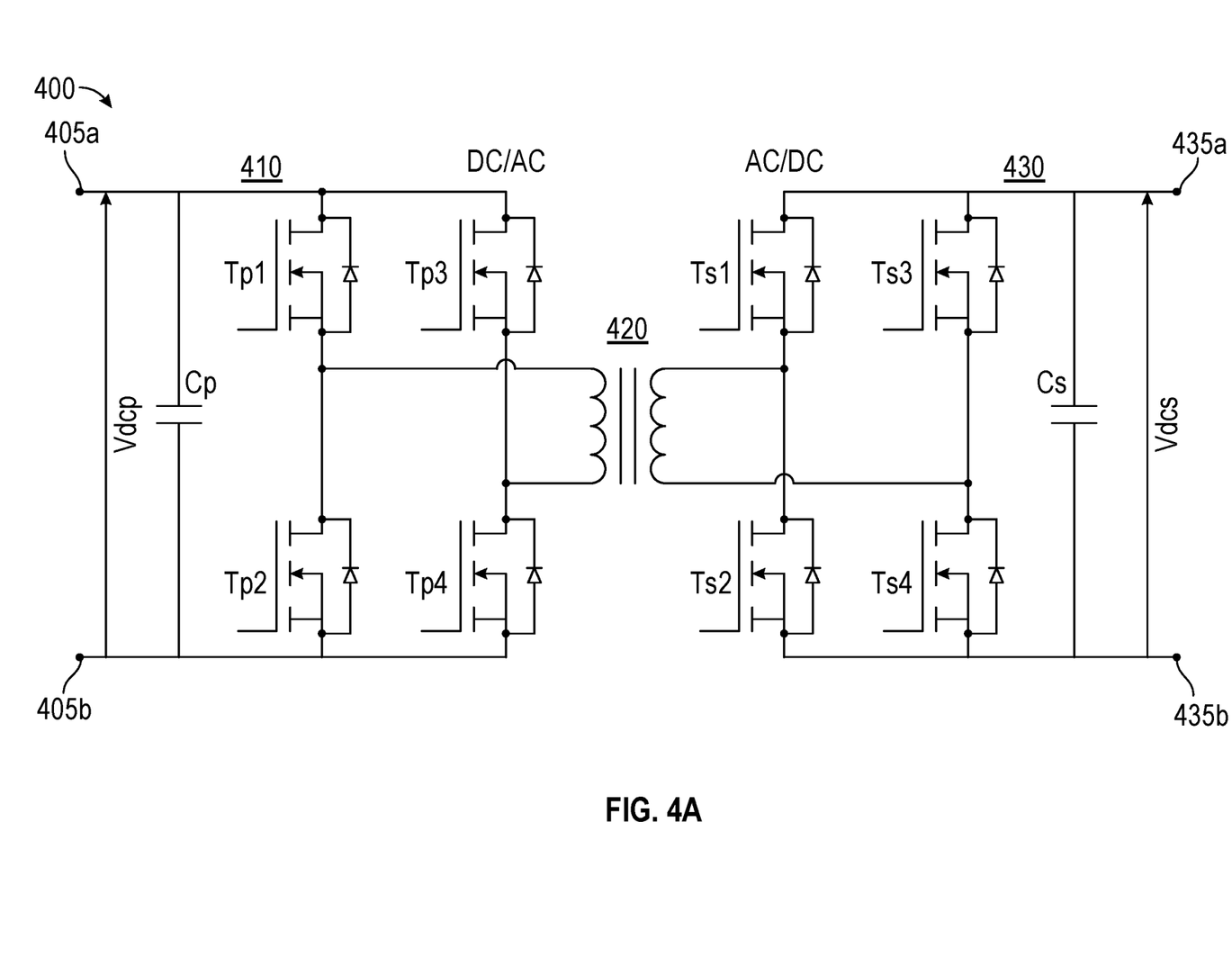
FIG. 4A is schematic diagram of an example DC-DC converter in accordance with an embodiment.

Referring now to FIG. 4A, shown is a schematic diagram of an example DC-DC converter in accordance with an embodiment. As shown in FIG. 4A, DC-DC converter 400 is implemented as a dual active bridge (DAB) isolated DC-DC converter. In various implementations, converter 400 may be used in a multi-port modular power converter such as those shown above in FIGS. 2 and 3 and/or other EV charging systems.

In the high level shown in FIG. 4A, converter 400 includes an input stage 410 having a plurality of SiC switches Tp1-Tp4. As shown, switches Tp1-Tp4 are implemented in an H-bridge configuration and couple to input nodes 405a,b that receive an incoming DC voltage Vdcp. As shown, a parallel capacitance Cp couples between the input nodes. In turn, the midpoints between serially coupled SiC switches Tp1, Tp2 and Tp3, Tp4 couple to an input winding, namely a primary winding of a high frequency transformer 420. In embodiments herein, high frequency transformer 420 may be configured to operate at frequencies between approximately 5 kHz and 100 kHz.

Still in reference to FIG. 4A, the secondary winding of high frequency transformer 420 in turn couples to the midpoints of serially connected SiC switches Ts1, Ts2 and Ts3, Ts4 of an output stage 430. As illustrated, output stage 430 further includes a capacitance Cs coupled between output ports 435a,b that provide an output DC voltage Vdcs. It is noted that switches Tp1-Tp4 and Ts1-Ts4 can be any type of power semiconductor switches including Silicon (Si) or Silicon Carbide (SiC), Gallium Nitrite (GaN) metal oxide semiconductor field effect transistors (MOSFETs) or insulated gate bipolar transistors (IGBTs).

With this arrangement implementing SiC or other high speed silicon power switches, improved conversion efficiency may be realized as a result of lower switching losses. In one implementation, SiC devices as in FIG. 4A may be implemented with low voltage switches such as 1700V SiC MOSFETs. Use of low voltage switches reduces the stress on insulation, dv/dt and parasitic capacitances, along with high reliability.

In addition, thermal management may be simplified, e.g., resulting in smaller and less expensive heat sinks or cooling systems, and/or replacement of fluid/forced air with natural cooling, as in some cases the dielectric fluid may provide sufficient cooling. Still further with embodiments, passive components (inductors, capacitors) may be downsized at higher switching frequencies. For example, with reference back to FIG. 4A, the input and output side capacitances may be on the order of approximately 40 microFarads. Also with a DAB design as in FIG. 4A, a power converter may be realized with greater simplicity and controllability, low switching losses, low sensitivity to system parasitic elements, bidirectional power flow, and the possibility to achieve Zero Voltage Switching (ZVS) for all semiconductors to allow for a high switching frequency and efficiency.

Figure 4B:
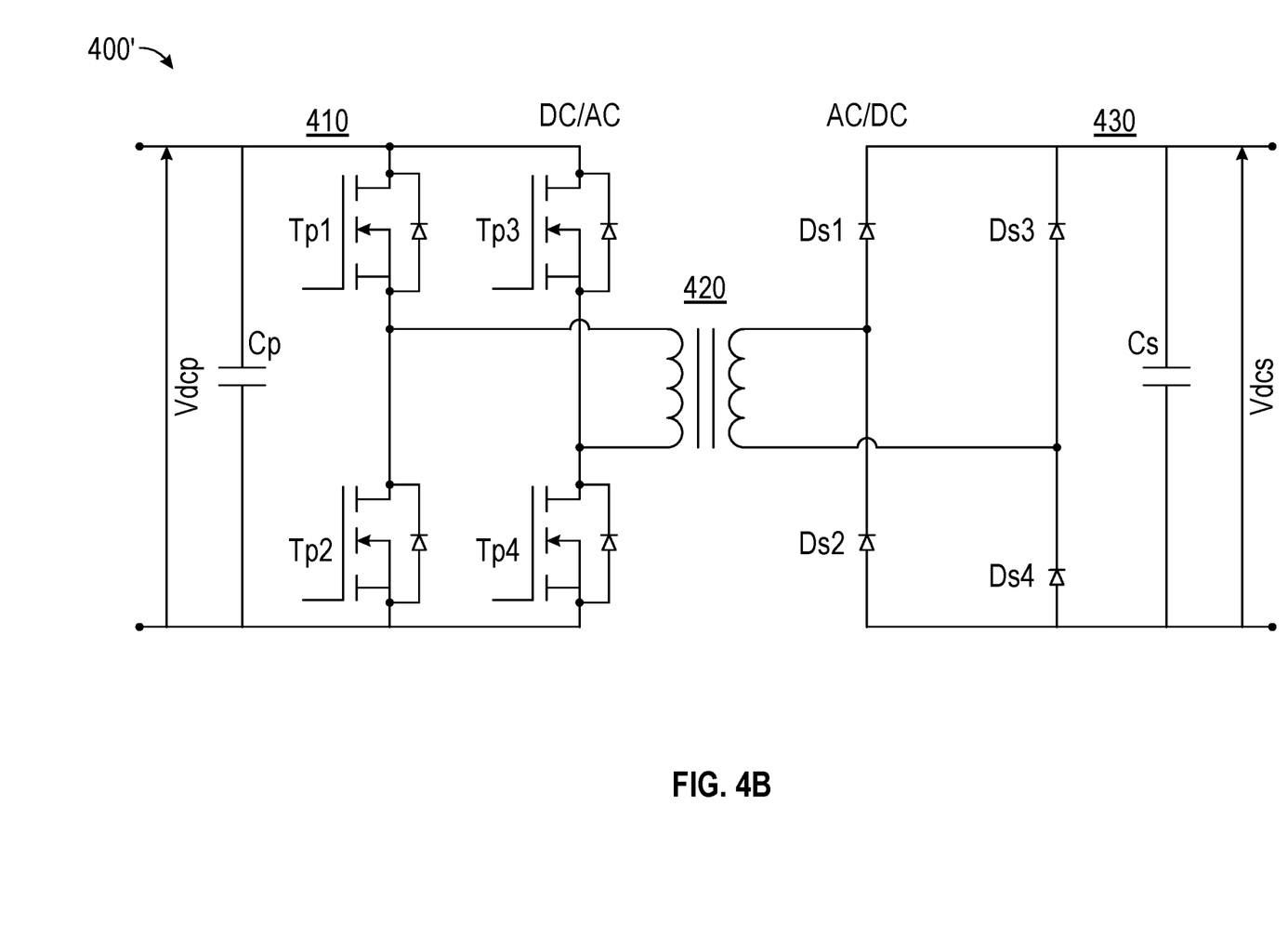
FIG. 4B is schematic diagram of an example DC-DC converter in accordance with another embodiment.

Referring now to FIG. 4B, shown is a schematic diagram of an example DC-DC converter in accordance with another embodiment. As shown in FIG. 4A, DC-DC converter 400' may be have a front end implemented the same as converter 400 of FIG. 4A. however here, the secondary side is implemented with passive devices, namely diodes Ds1-Ds4. With this implementation, power flow is unidirectional from grid to EV's, such that reverse power flow from EV to grid does not occur here.

Figure 5:
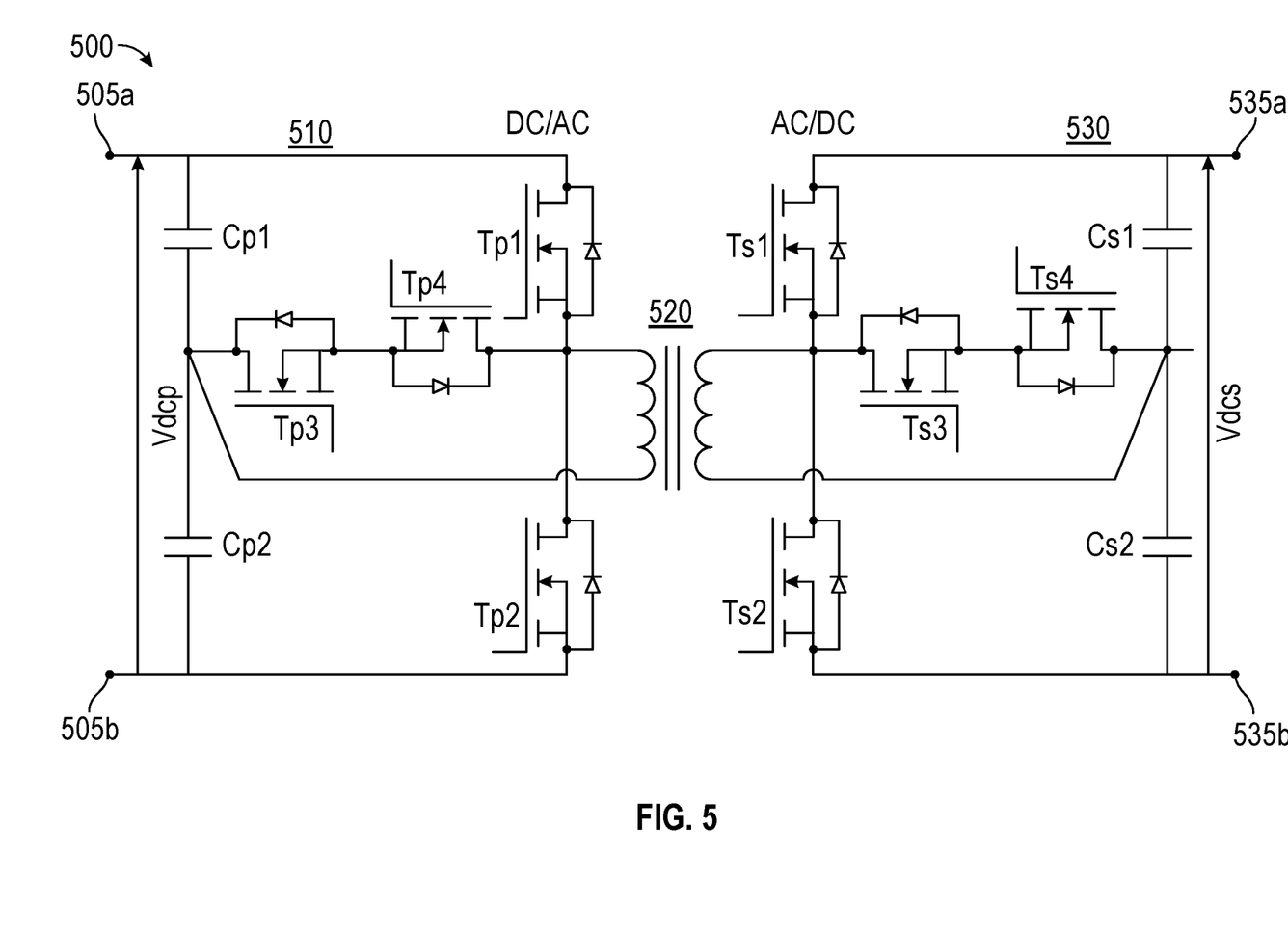
FIG. 5 is a schematic diagram of an example DC-DC converter in accordance with yet another embodiment.

In another embodiment, a DC-DC converter may take the form of a T-type bidirectional isolated DC-DC converter. Referring now to FIG. 5, shown is a schematic diagram of an example DC-DC converter in accordance with yet another embodiment. While formed of SiC devices, note the topology in FIG. 5 has SiC devices Tp1 and Tp2 coupled in series between input nodes 505a,b, and SiC devices Tp3 and Tp4 coupled in series between an input winding of a transformer 510 and input capacitors Cp1, Cp2. Similarly an output stage 530 has a T-type arrangement of SiC devices Ts1-Ts4 that providing switching between a secondary winding of transformer 520 and output nodes 535a,b having an output capacitance Cs1, Cs2 coupled therebetween. As above, switches Tp1-Tp4 and Ts1-Ts4 can be any type of power semiconductor switches including Si, SiC, and/or GaN MOSFETs or IGBTs. Of course other implementations of DC-DC converters are possible in other embodiments.

Figure 6:
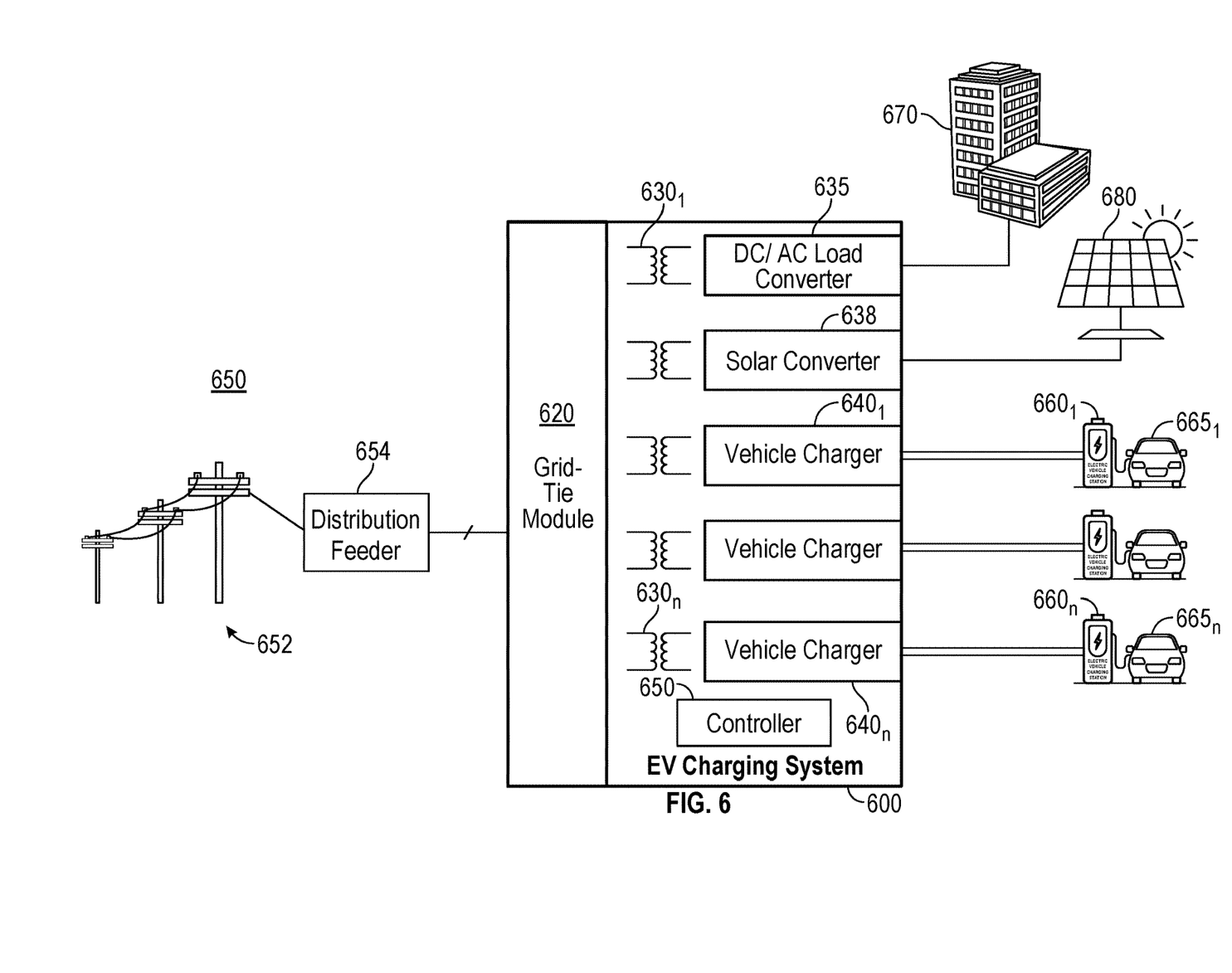
FIG. 6 is a block diagram illustrating an environment in which an EV charging system in accordance with another embodiment may be used.

Referring now to FIG. 6, shown is a block diagram illustrating an environment in which an EV charging system in accordance with another embodiment may be used. More particularly in FIG. 6, an EV charging system 600 may be generally similarly configured the same as EV charging system 100 of FIG. 1A (and thus reference numerals generally refer to the same components, albeit of the "600" series in place of the "100" series of FIG. 1A). However in this embodiment, system 600 includes at least one DC-AC load converter 635 to provide AC power to a facility 670. As further shown, system 600 also includes a solar converter 638 that may couple to a solar photovoltaic panel 680. In this way, incoming solar energy can be provided to grid network 650, to EV charging stations 660 and/or stored in an energy storage (such as a battery system of system 600 (not shown for ease of illustration in FIG. 6)). Thus with this embodiment, EV charging system 600 may couple to one or multiple AC or DC loads and/or to one or multiple solar photovoltaic panels.

Figure 7:
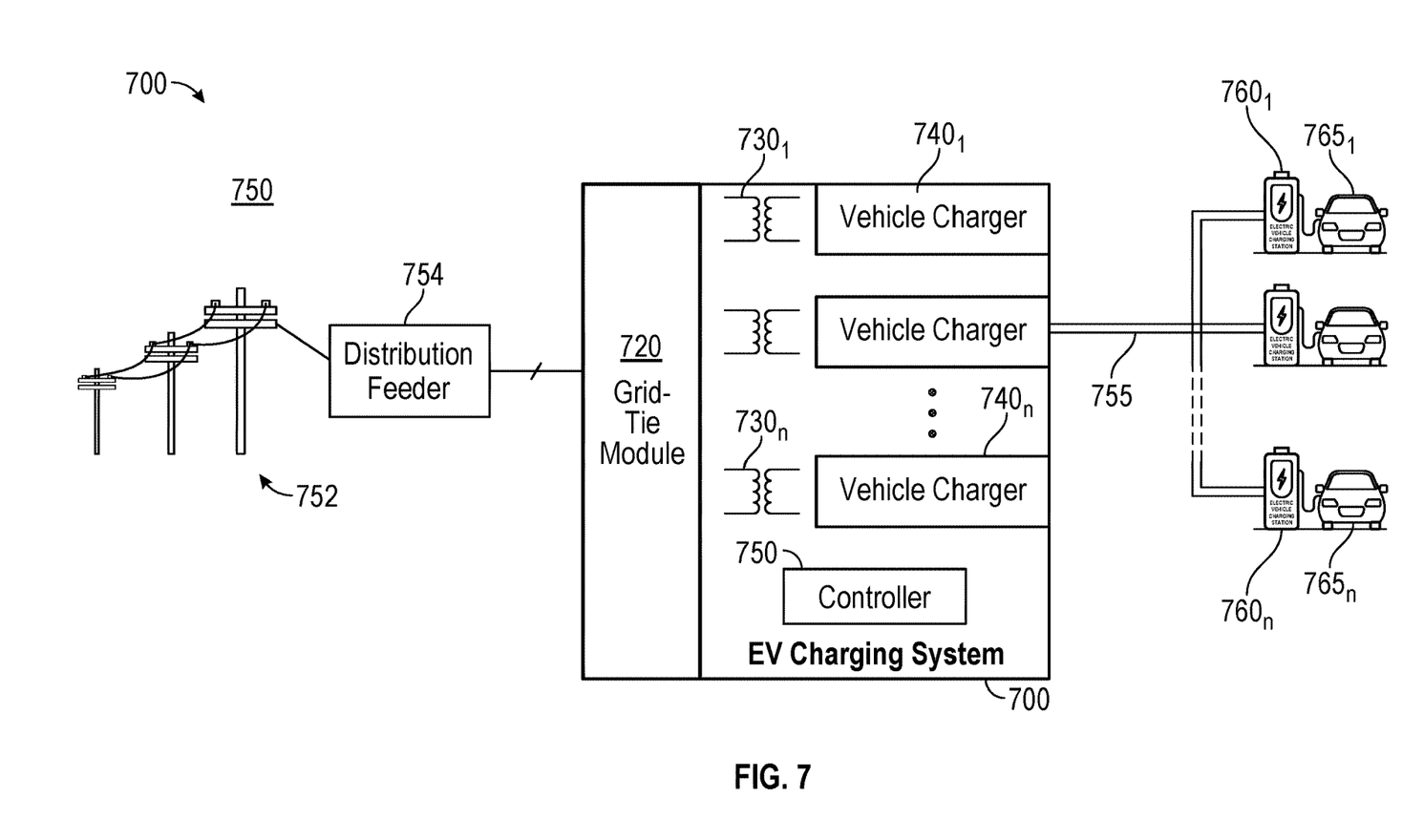
FIG. 7 block diagram illustrating an environment in which an EV charging system in accordance with a further embodiment may be used.

Still further implementations are possible. For example, isolated vehicle charger section can interface with multiple EV charging dispensers. Referring now to FIG. 7, shown is a block diagram illustrating an environment in which an EV charging system in accordance with a further embodiment may be used. More particularly in FIG. 7, an EV charging system 700 may be generally similarly configured the same as EV charging system 100 of FIG. 1A (and thus reference numerals generally refer to the same components, albeit of the "700" series in place of the "100" series of FIG. 1A).

However in this arrangement, EV charging system 700 may be configured such that a single vehicle charger 740 couples via output lines 755 to multiple EV charging dispensers 760.

Figure 8:
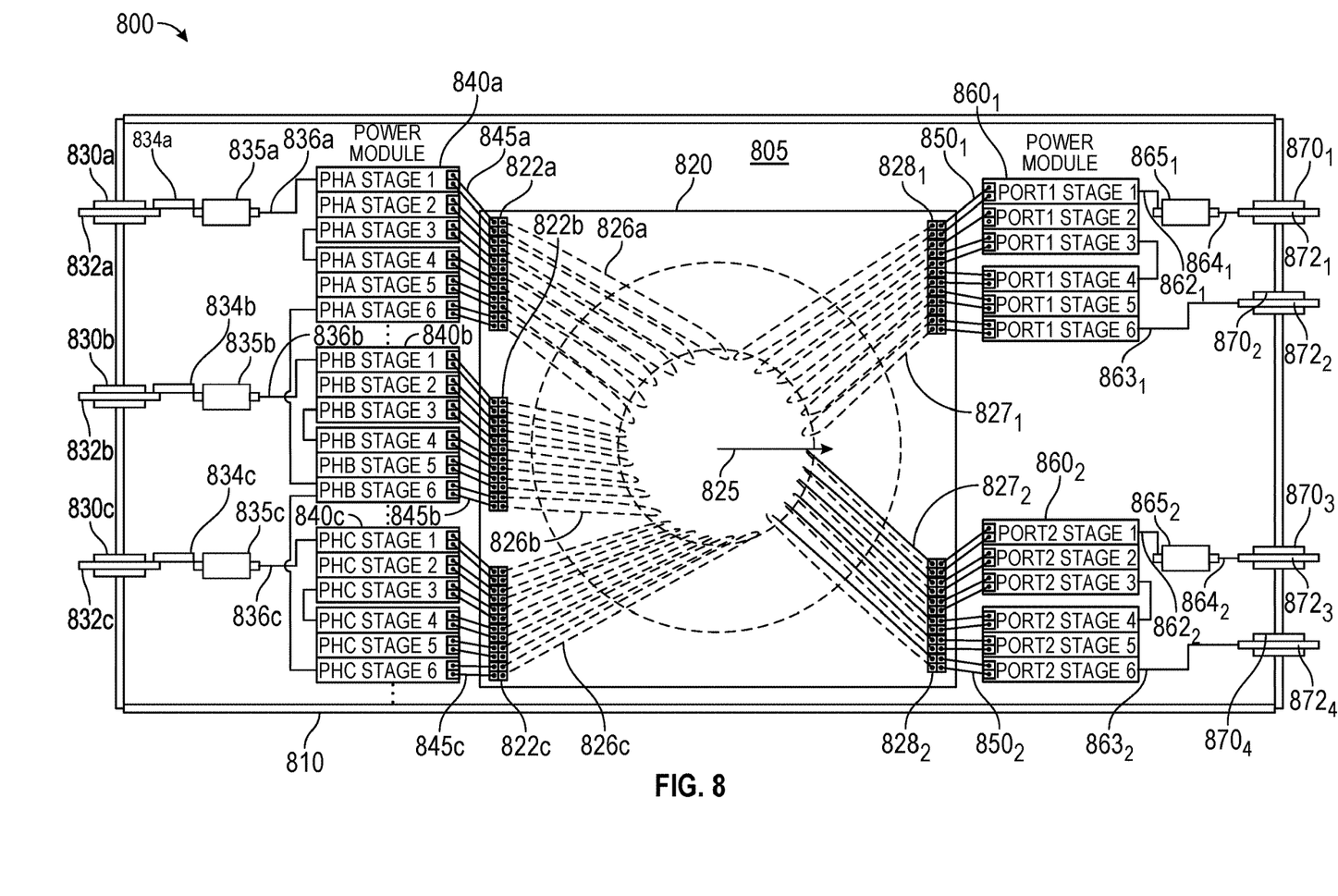
FIG. 8 is a cross-sectional view of a power conversion system in accordance with an embodiment.

Referring now to FIG. 8, shown is a cross-sectional view of a power conversion system in accordance with an embodiment. As shown in FIG. 8, system 800 may be implemented within an enclosure 810. Although embodiments are not limited in this regard, enclosure 810 may be a housing to be adapted in relatively close relation with one or more EV dispensers such as systems discussed above, e.g., in FIGS. 1A, 1B and 6-7. As will be described further herein, in some cases enclosure 810 may be part of an assembly including integrated EV dispensers such as shown in FIG. 1B. Thus referring back to FIG. 1B, in some cases the housing in which enclosure 810 is adapted may have integrated dispensers so that EVs may directly connect for charging, avoiding the need for charging stations or other separate dispensers.

In any event, enclosure 810 may be configured to be fully enclosed once field installed. To complete this installation, a dielectric fluid 805 may be introduced into enclosure 810, via a vacuum sealing process, to ensure that enclosure 810 is completely filled with this fluid, and impurities are removed. Although embodiments are not limited in this regard, in different implementations dielectric fluid 805 may be mineral oil, vegetable oil, silicone fluid, and/or combinations of two or more of these. In yet other implementations, other dielectric fluids such as castor oil, fluorocarbons, liquid nitrogen, liquid helium, and/or sulfur hexafluoride may be used.

In still other cases, other dielectric fluids may be used, such as transformer oils (mineral oil with additives), engineered fluids (oils), gas-to-liquid (GTL) fluids such as Risella™ X 415 (which is rated at greater than 30 KV) or another immersion cooling fluid such as S3X (both available from Shell Corporation). And in other cases another single phase or two phase cooling liquid such as NOVEC™ or Fluorinert™ (both available from 3M Corporation) may be used Dielectric fluid provides an insulation system with higher dielectric constant as compared to air. For example, the dielectric constant of mineral oil is 2.2 versus vacuum which is assumed to be 1. Dielectric breakdown in air occurs at an electric field of $E=3\times10^6$ V/m versus dielectric breakdown in mineral oil at an electric field $E=100\times10^6$ V/m.

Thus once field installed and dielectric fluid 805 is introduced, enclosure 810 is sealed from regular access (of course, enclosure 810 may be unsealed for maintenance operations). In this way, enclosure 810 provides a safe barrier such that components within it are free from contamination by dust, dirt or other particulate matter, and even air. In this way, there is limited or no ability for degradation of components due to partial discharge.

With this arrangement, enclosure 810 may have a relatively small footprint. For example, to accommodate input of a medium voltage and output of multiple DC or AC voltages suitable for EV charging, enclosure 810 may have a footprint of approximately five feet by five feet to provide a power rating of up to approximately 2.5 megawatts (MW). Enclosure 810 may have a height between approximately 3 feet and 10 feet, and in one or more examples between approximately 5-6 feet. Of course other dimensions and power ratings are possible in other implementations.

In the illustration of FIG. 8, system 800 may be adapted for use for EV fast charging, and may directly receive grid power from a grid. As shown, incoming three-phase power may be provided through a plurality of conductors 832a-c, each of which is implemented within a corresponding bushing 830a-c that is adapted through a wall of enclosure 810. In turn, conductors 832 may couple via corresponding wires 834-c to corresponding input reactors 835a-c. In one or more embodiments, wires 834 may be implemented as high voltage wires having reinforced insulation to provide a measure of protection. For example, these wires may be rated for the grid voltage connected to the bushings and can be implemented as multiple conductors that are oversized for immersion in fluid to withstand high fault current required for protection by fuse or circuit breaker. In other embodiments, cables and/or busbars such as flexible busbars may be used to couple components (in place of wires 834 and/or other wires enumerated herein). In turn, reactors 835-c are coupled to corresponding power modules 840a-c via wires 836a-c. In one example, these wires may be rated at 600 Vac or lower Teflon coated wires sized for immersion in fluid to meet product current ratings. Thus with embodiments, smaller, cheaper wire and other components may be used given this application of a dielectric-filled enclosure.

As shown, each power module 840 acts as a power converter that may be implemented with a plurality of cascaded stages. Although six stages are shown for each phase, understand embodiments are not limited in this regard and more or fewer stages may be present. Note that in an embodiment, each power module 840 may include stages such as shown and discussed above in FIGS. 4A-5. Also note that other possible topologies may be used on the grid side, including AC or DC power/voltage tie/inputs, and the number of power stages per power module can be different. Also the power stages can be implemented using low voltage or medium voltage components, and further understand that the power stages can be connected in parallel in certain implementations.

Power modules 840 may receive incoming AC voltage and perform an AC-DC conversion and a DC-AC conversion, resulting in a high frequency AC voltage that is provided via corresponding wires 845-c to a high frequency transformer 820. Understand that transformer 820 can be implemented as multiple transformers, in some embodiments. As shown, each power module 840 may couple to a corresponding terminal block 822-c of high frequency transformer 820. While shown in this embodiment with terminal blocks, understand that in other embodiments, different connection mechanisms such as cable connectors, splices, bolts or so forth instead may be used. And in other cases, combinations of these different connection mechanisms may be used. Thus with embodiments herein providing dielectric fluid protection, a relatively small, simple low cost terminal block or other cable connector arrangement may be used to receive an incoming high frequency AC voltage, rather than using medium voltage terminal blocks or medium voltage cable connectors (although such medium voltage components may be used if desired). In contrast, conventional implementations typically use high voltage porcelain ceramic or epoxy bushings that are typically 2 to 4 inches in diameter for one connection and 4 to 8 inches in height, while a terminal block herein may be 1.5×2×0.5 inches for both connections. Each winding requires a single terminal block or two bushings. Thus the space volume ratio is approximately 50 times larger for conventional bushings as compared to an implementation herein.

Also note that with the dielectric fluid arrangement, relatively small distances between components may be realized. As an example, reactors 835 (e.g., 15 kV reactors) may be positioned relatively closely to power modules 840, e.g., within as small as 0.75 inch clearance distance with at least a 10× safety factor. Power modules 840, in turn, may be adapted about an exterior of high frequency transformer 820 and in close relation thereto. For example, power modules 840 configured for 15 kV may have as small as a 0.75 inch separation from transformer 820. Hence this configuration results in reduced insulation structures, and further reducing size and cost of a power conversion system.

Still referring to FIG. 8, terminal blocks 822 couple to input windings of transformer 820. Specifically as shown, each terminal block 822 couples to a set of input windings 826a-c. In the embodiment shown, only six windings may be present per phase, each of which may be implemented with relatively small and low cost material.

Transformer 820 may include a transformer core 825, e.g., an iron nanocrystalline, ferrite or equivalent core. Although embodiments are not limited in this regard, transformer core 825 may have a diameter of approximately 30 inches and an axial length of approximately 5 inches. In one example, since the winding power is high frequency and the core material is nanocrystalline, the number of turns per winding is significantly reduced over normal 50/60 Hz transformers which use silicon steel as core material. The fewer number of turns simplifies the transformer construction and enables better magnetic linkage through physical placement and smaller transformer volume. The few turns and immersion in fluid enables manual transformer construction that includes simple fiberglass tubes to be constructed for wiring paths to reduce size further while meeting the same basic impulse voltage levels (BIL) (95 to 110 kV for 15 kv) required for much physically larger 50/60 Hz transformers. By providing a high frequency transformer, size benefits result.

At an output, transformer 820 has a plurality of output windings 827$_{1-2}$ that couple to corresponding output terminal blocks 828$_{1-2}$. Terminal blocks 828 in turn couple via low voltage wires 850$_{1-2}$ to corresponding power modules 860$_{1-2}$ that act as a power converter that may be implemented with cascaded stages. Note that while a two port implementation is shown where each port has six stages, understand embodiments are not limited in this regard and more or fewer ports and stages may be present in other embodiments. Power modules 860 may be implemented as AC-DC converters and corresponding DC-DC converters to result in generation of DC voltages that may be suitable to be used as EV fast charging voltages, and/or storage, solar, or uninterruptable power supply. Other possible configurations may be provided to realize AC-DC and DC-AC conversion to provide AC voltage to charge EV or connect to a load.

Still with reference to FIG. 8, power modules 860 in turn may couple via corresponding low voltage wires 862$_{1,2}$-863$_{1,2}$ to conductors 872$_{1-4}$ implemented within bushings 870$_{1-4}$. Note further presence of output reactors 865$_{1-2}$. Understand while shown with this particular arrangement in FIG. 8, many variations and alternatives are possible.

Further, understand that in this simplified cross-sectional view, certain structural components are not shown. These structural components may include one or more frame assemblies within which power modules, transformers, and reactors may be adapted. In general, as shown in FIG. 8 the high frequency transformer may be implemented within a central portion of an enclosure, with at least the power modules positioned radially outwardly with respect to a core of the transformer. Furthermore, while not shown in FIG. 8, understand that additional electronics may be present and used for communicating control, status and other information, e.g., via fiber optics. Such components may be present and adapted on a top side of a frame assembly above transformer 820.

In addition, although not shown in FIG. 8, in certain implementations an active cooling system may be provided. In such cases, conduits for communication of dielectric fluid 805 may occur in which heated fluid from within enclosure 810 may be output from enclosure 810 through one or more outlet ports. Then dielectric fluid 805 may be cooled in some form of heat exchanger, with cooled fluid being passed back into enclosure 810 via one or more inlet ports. Finally, note that enclosure 810 itself may be adapted within an industrial-grade housing to protect it from the elements. This is especially so in EV charging system implementations in which the housing and enclosure 810 may be present in a parking lot, parking structure or other outside or indoor environment.

Thus, with embodiments, a power conversion system may be provided to enable EV fast charging with a relatively small footprint. In contrast, many conventional EV charging systems implement power conversion in a footprint that is at least the size of a shipping container—many times larger than the footprint of enclosure 810.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A system comprising:
   an enclosure;
   a plurality of first converters adapted within the enclosure to receive grid power at a distribution grid voltage and convert the distribution grid voltage to at least one second voltage;
   at least one high frequency transformer adapted within the enclosure, the at least one high frequency transformer coupled to the plurality of first converters to receive the at least one second voltage;
   a plurality of second converters adapted within the enclosure and coupled to an output of the at least one high frequency transformer to receive the at least one second voltage and convert the at least one second voltage to a third voltage; and
   a dielectric fluid adapted within the enclosure, the dielectric fluid to provide dielectric isolation and wherein the plurality of first converters, the at least one high frequency transformer, and the plurality of second converters are immersed within the dielectric fluid.

2. The system of claim 1, wherein the dielectric fluid is to provide partial discharge protection for the system.

3. The system of claim 1, wherein the plurality of first converters are coupled to the at least one high frequency transformer via connection means of the at least one transformer, and at least some of the plurality of first converters are coupled via wires, cables, or flexible busbars to a corresponding one of a first plurality of reactors.

4. The system of claim 3, further comprising a plurality of high voltage wires or busbars, each of the plurality of high voltage wires or busbars coupled between one of the first plurality of reactors and one of a plurality of conductors.

5. The system of claim 4, further comprising a plurality of bushings adapted to the enclosure, each of the plurality of bushings to provide an insulative pathway for one of the plurality of conductors from an interior of the enclosure to an exterior of the enclosure.

6. The system of claim 3, wherein the plurality of second converters are coupled to the at least one high frequency transformer via second connection means of the at least one transformer, and at least some of the plurality of second converters are coupled via wires or busbars to a corresponding one of a second plurality of reactors.

7. The system of claim 1, wherein the dielectric fluid comprises at least one of mineral oil, vegetable oil, or silicone fluid.

8. The system of claim 1, wherein the at least one high frequency transformer is to electrically isolate the plurality of second converters.

9. The system of claim 1, wherein the at least one high frequency transformer comprises a core, wherein the plurality of first converters are adapted radially from the core on a first side of the at least one high frequency transformer and the plurality of second converters are adapted radially from the core on a second side of the at least one high frequency transformer.

10. The system of claim 1, wherein the dielectric fluid comprises a cooling medium for the system.

11. A system comprising:
an enclosure;
a plurality of input power stages adapted within the enclosure, each of the plurality of input power stages to receive a phase of grid power at a distribution grid voltage and convert the distribution grid voltage to a first high frequency AC voltage;
a high frequency transformer having a core and adapted within the enclosure, the high frequency transformer having:
a first plurality of connection means each for coupling the first high frequency AC voltage to one of a first plurality of winding sets adapted about the core; and
a second plurality of connection means each for coupling a second high frequency AC voltage from one of a second plurality of winding sets adapted about the core to one of a plurality of output stages;
the plurality of output stages adapted within the enclosure, each of the plurality of output stages to receive and convert the second high frequency AC voltage to a third voltage; and
a dielectric fluid adapted within the enclosure, the dielectric fluid to provide dielectric isolation and wherein the plurality of input power stages, the high frequency transformer, and the plurality of output stages are immersed within the dielectric fluid.

12. The system of claim 11, wherein the first plurality of connection means comprises a first plurality of terminal blocks and the second plurality of connection means comprises a second plurality of terminal blocks.

13. The system of claim 11, wherein the first plurality of connection means comprises a first plurality of cable connectors and the second plurality of connection means comprises a second plurality of cable connectors.

14. The system of claim 11, wherein the first plurality of connection means comprises a plurality of cable connectors and the second plurality of connection means comprises a plurality of terminal blocks.

15. The system of claim 11, wherein the dielectric fluid comprises a cooling medium for the system.

16. The system of claim 15, further comprising a heat exchanger coupled to the enclosure, the enclosure comprising:
a plurality of outlet ports via which the dielectric fluid is provided to the heat exchanger; and
a plurality of inlet ports via which the dielectric fluid is received from the heat exchanger.

17. An electric vehicle (EV) charging system comprising:
a housing;
an enclosure adapted within the housing;
a plurality of first converters adapted within the housing to receive grid power at a distribution grid voltage and convert the distribution grid voltage to at least one second voltage;
at least one high frequency transformer coupled to the plurality of first converters to receive the at least one second voltage and a plurality of second converters coupled to an output of the high frequency transformer;
the plurality of second converters adapted within the housing and coupled to the output of the at least one high frequency transformer, each of the plurality of second converters to receive the at least one second voltage and convert the at least one second voltage to a third DC voltage;
a dielectric fluid adapted within the enclosure, the dielectric fluid to provide dielectric isolation and wherein the plurality of first converters, the at least one high frequency transformer, and the plurality of second converters are immersed within the dielectric fluid; and
one or more EV charging dispensers coupled to the housing to receive the third DC voltage from at least one of the plurality of second converters and provide a charging voltage or a charging current to one or more EVs.

18. The EV charging system of claim 17, further comprising an active cooling system.

19. The EV charging system of claim 18, wherein the enclosure comprises:
a plurality of outlet ports via which the dielectric fluid is provided to the active cooling system; and
a plurality of inlet ports via which the dielectric fluid is received from the active cooling system.

20. The EV charging system of claim 17, wherein:
the dielectric fluid is to provide partial discharge protection;
the at least one high frequency transformer is to electrically isolate the plurality of second converters; and
each of the plurality of second converters is to convert the at least one second voltage to the third DC voltage that is galvanically isolated from the third DC voltage of others of the plurality of second converters.

* * * * *